July 9, 1968 H. B. KAST 3,391,702
LIQUID FLOW SYSTEMS
Filed Dec. 14, 1965
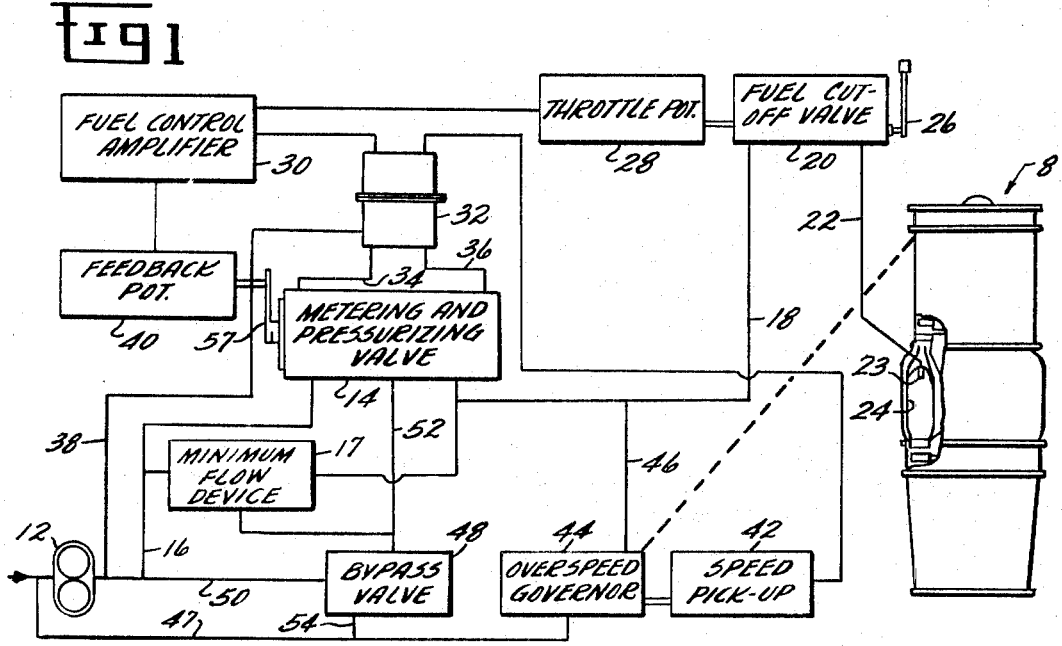
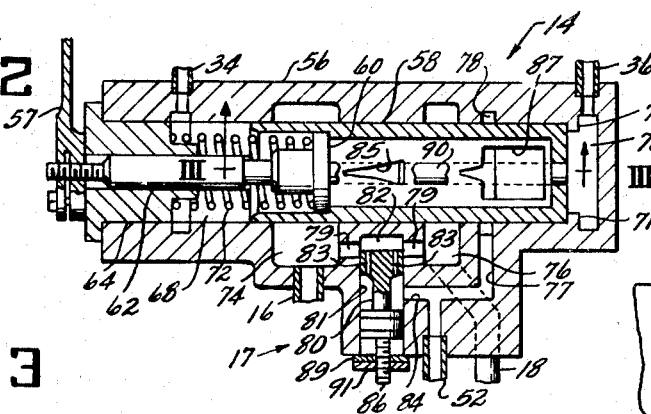
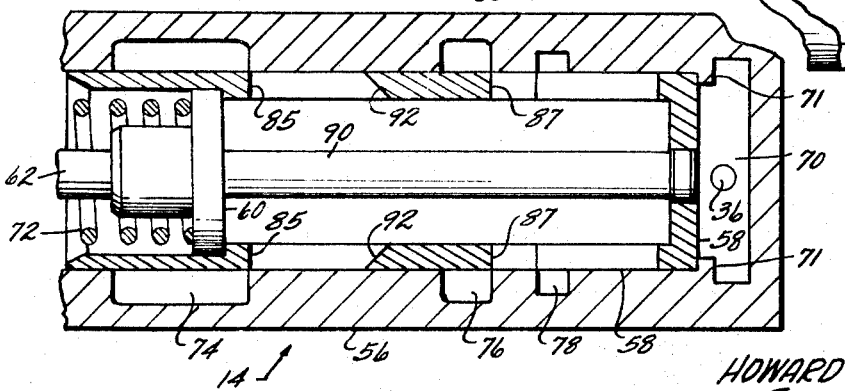
INVENTOR.
HOWARD B. KAST
BY
ATTORNEY

United States Patent Office 3,391,702
Patented July 9, 1968

3,391,702
LIQUID FLOW SYSTEMS
Howard B. Kast, Fairfield, Ohio, assignor to General
Electric Company, a corporation of New York
Filed Dec. 14, 1965, Ser. No. 513,789
6 Claims. (Cl. 137—110)

ABSTRACT OF THE DISCLOSURE

The disclosure shows a fuel delivery system comprising a combined metering and pressurizing valve through which fuel flows at a metered rate for delivery to the combustor of a gas turbine engine. A pump pressurizes fuel for delivery to a single, hollow piston which is provided with two sets of ports. A constant pressure differential is maintained across the first set of ports so that fuel flow is a function of the area of these metering orifice means. The second set of ports provides pressurization orifice means. In this way a relatively high pressure is maintained at the pump output to the metering and pressurizing valve which enables actuation of auxiliary devices with a sufficiently high pressure source when there is a low rate of fuel flow. When the piston is displaced, the effective area of both sets of ports is increased. Fuel flow is increased but the pressure drop across the pressurization orifice means is not increased proportionately, and the maximum pump pressurization is minimized. A minimum flow device operating on the same principles of a metering and pressurizing orifice combination provides a predetermined minimum flow level, while still providing the desired high pressure source for actuation of auxiliary devices at low flow rates.

---

The present invention relates to improvements in liquid flow systems which are adapted to meter flow as well as to provide a relatively high pressure source for hydraulic actuation of various devices over a relatively wide range of metered flow rates and, more particularly, to improvements in such systems adapted to deliver fuel for gas turbine engines.

To achieve weight reduction and simplification in high performance aircraft engines, fuel is used as a hydraulic medium for actuating auxiliary devices and is pressurized for such purposes by the same pump that delivers fuel to the combustor nozzles of the engine. The rate of fuel flow controls the speed of the engine. One method of controlling the flow rate is to maintain a constant pressure differential across a variable area orifice. As the engine starts and at low speeds the back pressure of the nozzles is relatively low. If the downstream pressure of the metering orifice is the same as that of the nozzles, the pressure differential across the orifice should be at least at a level high enough for hydraulic operation of the auxiliary devices or systems. A net result is that under maximum flow conditions as unduly high pressure capacity is required from the pump in order to maintain the constant pressure differential across the metering orifice.

To minimize the maximum pressure requirements of the fuel pump it has become an accepted practice to provide a spring loaded pressurizing valve which passes fuel to the nozzles only after a certain pressure condition has been reached. Thus a back pressure higher that that of the nozzles during low rates of flow is artificially created. This artificially induced pressure is reflected back to the pressurizing pump, or the upstream side of the metering orifice, so that a high pressure source is available for the servo system. By and large such an approach is effective in reducing the pressure requirements of the fuel pump. However, there are disadvantages in that maintaining a constant pressure differential across the metering orifice is at times difficult with a result that there is a lack of stability in the metered flow of fuel. Furthermore, the spring loaded valve itself is an additional component which adds to the cost and weight of the fuel system.

Hence, one of the primary objects of the invention is to derive a high pressure source for hydraulic actuation of an auxiliary or ancillary device from a fuel pressurizing pump which normally delivers fuel to the nozzles of an engine and to do so in a manner which simplifies and reduces the weight of the fuel flow control, and furthermore to improve the stability of the metered flow of fuel delivered to the nozzles.

Another object of the invention is to attain the above ends with the use of fuel pumps having a relatively low pressure capacity.

Another object is to attain the above ends using a fuel control valve that accurately meters fuel over a broad range of flow rates.

Still another object is to provide a control valve giving improved accuracy of metered flow.

In a broader aspect, the object of the invention is to provide a liquid flow control system providing both a high pressure source for hydraulic actuation of auxiliary devices and a metered flow of liquid for delivery to a discharge point having a back pressure varying over a wide range.

The above objects are achieved by providing a liquid flow control system wherein pressurized liquid follows a flow path to a discharge point. Metering orifice means is interposed in said flow path, and pressure regulating means maintains a constant pressure differential thereacross to accurately control the rate of liquid flow. Pressurizing orifice means are interposed in series with said metering orifice means and have a predetermined relationship thereto for providing a high restriction to flow during low flow rates whereby a relatively high pressure is maintained upstream of the two orifice means for hydraulic actuation purposes.

Preferably the pressurizing and metering orifice means are formed through the use of a single valve element to attain simplicity of construction and minimization of weight. In a preferred form of the invention the metering orifice means comprise oppositely disposed ports through which liquid flows to the interior of a hollow cylinder. To prevent the flows therethrough from impinging on one another and thus assure accurate metered flow a baffle is provided between these ports. To further stabilize the flow of liquid the base surfaces of triangular metering ports are beveled in the direction of flow therethrough.

The above and other related objects and features of the invention will be apparent from a reading of the following description of the disclosure found in the accompanying drawing and the novelty thereof pointed out in the appended claims.

In the drawing:

FIGURE 1 is a schematic representation of a gas turbine engine fuel control system embodying the present invention;

FIGURE 2 is a longitudinal section of a metering and pressurizing valve indicated in FIGURE 1;

FIGURE 3 is an enlarged section taken on line III—III of FIGURE 2;

FIGURE 4 is a partial, longitudinal section of a portion of a piston shown in FIGURE 2 illustrating a modified porting arrangement.

FIGURE 1 shows in block fashion the basic components of a fuel system embodying the present invention and controlling fuel flow to a gas turbine engine 8. Fuel is drawn from a tank, not shown, and pressurized by a pump 12 for delivery to a metering and pressurizing valve 14 through conduit 16. A minimum flow device 17 provides a parallel fuel flow path from conduit 16 to a conduit 18 downstream of valve 14. The fuel then flows through conduit 18 from either the valve 14 or device 17 to a main cut-off valve 20 and finally through conduit 22 to the nozzles 23 of an engine combustor 24. The cut-off valve may be controlled by a pilot operated throttle lever 26. Initial movement of the throttle lever from its off position to its start or idle position fully opens the cut-off valve so that once the engine is operating, this valve has no function in controlling fuel flow.

Further angular movement of throttle lever 26 is sensed by a throttle potentiometer 28 that produces a demand signal which is fed to a fuel control amplifier 30. The demand signal is compared with an actual speed signal from a speed pick-up 42 which is conveniently connected to an overspeed governor 44 and responds to engine speed. Utilizing these signal inputs, the fuel control amplifier 30 provides an output signal that controls an electro-hydraulic servovalve 32. The servovalve 32 directs flow of hydraulic actuating fluid through conduits 34, 36 to opposite ends of the valve 14 to position it and thus control the amount of fluid delivered to the engine. Because of certain novel features of the valve 14 and/or the minimum flow device 17, which will be discussed later, fuel upstream of the valve 14 is highly pressurized and may be used as the hydraulic actuating fluid by being fed from the discharge side of pump 12 through conduit 38 to the servovalve 32.

A signal from the feedback potentiometer 40 which is responsive to the rate of movement of the valve 14 further modifies the control signal from the fuel control amplifier 30 for stability purposes. The derivation of these various signals and their use in the operation of the fuel control amplifier 30 for developing a proper control signal for the servovalve 32 is in accordance with teachings well known to those skilled in the art.

Likewise, operation of the over-speed governor 44 is conventional in that fuel will be bypassed from conduit 18 through conduit 46 in the event the engine is operating at an excessive speed. The bypassed fuel is returned to the inlet side of pump 12 through line 47.

Before leaving the block diagram of FIGURE 1, a brief reference will be made to a pressure regulating bypass valve 48 which is connected by conduit 50 to conduit 16 and by pressure conduit 52 to the valve 14 and the minimum flow device 17. This pressure regulating valve may pass fuel from the conduit 50 to a conduit 54 connected to the return line 47 in response to the pressure existing in conduit 52 to maintain constant pressure drops across metering orifices in parallelly disposed valve 14 and the minimum flow device 17.

Referring now to FIGURES 2 and 3, the valve 14 comprises an outer housing 56 having a hollow cylinder which may be in the form of a piston 58 slideable therein. One end of the piston 58 is solid and the other end is closed by a disc 60 to prevent hydraulic actuating fluid from mixing with fuel which is to be metered for flow to the nozzles 23. A stem 62 extends from disc 60 and passes through a bushing 64 to provide a mechanical connection 57 for the feedback potentiometer 40.

Hydraulic actuating fluid is fed to the valve 14 by conduits 34 and 36 which connect with chambers 68 and 70 respectively, at opposite ends of the piston 58. Fluid pressures in the chamber 68 and 70 control displacement of the piston 58 during engine operation, but during shutdown a light compression spring 72 is provided in chamber 68 to bias the piston 58 against the stops 71 in the illustrated closed position.

Three annular chambers 74, 76, and 78 are formed in the housing 56 around the piston 58. Conduit 16 is connected to chamber 74, conduit 18 is connected to chamber 76, and conduit 52 is connected to chamber 78 through a passageway 77.

The minimum flow device 17 is also incorporated in the housing 56 and provides a flow path between chamber 74 and 76 by way of a passage 79. A piston 80 is disposed in a bore 81 intersecting the passage 79 and forming inlet and outlet orifices to a chamber 82. Piston 80 is adjustably positioned by rotating threaded shaft 86 which cooperates with nut 89 to regulate the areas of the inlet and outlet orifices to chamber 82. Nut 89 is affixed to housing 56 by suitable means and lock nut 91 fixes the position of the piston 80. The chamber 82 is also connected to the pressure conduit 52 through holes 83 extending to a reduced portion of piston 80 and a passage 84 formed in housing 56.

Fuel flow through valve 14 is accomplished by providing opposed metering ports 85, which are positioned to uncover the annular chamber 74 as the piston is displaced from its illustrated position and thereby function to permit an increased flow of fuel into the piston interior. Opposed pressurizing ports 87 then provide for fuel flow from the interior of piston 58 to the chamber 76 and conduit 18, as the piston is displaced.

Ports 85 and the edge of annular chamber 74 cooperate to form metering orifices of valve 14, and ports 87 and the edge of chamber 76 cooperate to form pressurizing orifices, respectively. It can be seen that the effective area of the orifices formed by the cooperation between the above elements increases as the piston 58 is urged into its operating position.

It has been discovered that with extremely high flow rates through the ports 85, when the streams impinge on each other, a turbulence results which creates instability in metering the rate of flow of fuel. To overcome this problem a baffle is provided in the piston interior which separates the oppositely directed flows. The baffle may take the form of a central rod 90, best shown in FIGURE 3, that extends from one end to the other of piston 58 and has a diameter approximating the width of the generally triangular ports 85. The streams of fuel passing through the ports 85 will then be deflected by the rod 90 and the flow of fuel will be maintained accurately at the metered rate established by the openings of the metering orifices.

It was further discovered that accurate metering of liquid was substantially improved by beveling the bases at 92 of the ports 85 shown in FIGURE 3 so that the angular flow vectors caused by the divergent sides of ports 85 would not create a turbulence or other unstable condition which would adversely affect the delivery of the desired metered amount of fuel particularly when these ports are fully open.

Pressure regulating valve 48, shown in FIGURE 1, may be any well known bypass valve which is adapted to maintain a constant pressure differential between two points in a liquid flow system. Thus in the case of the minimum flow device 17, the pressure connection 84 from chamber 82 to conduit 52 causes the pressure regulating valve 48 to maintain a constant pressure difference across the inlet orifice to chamber 82 thereby metering fuel as a function of orifice area.

Similarly the pressure connection from the interior of piston 58 through port 87 to chamber 78 and conduit 52 causes the pressure regulating valve 48 to maintain a constant pressure differential across the metering orifices so that the rate of fuel flow is a function of the orifice area and thus a function of the position of piston 58.

The operation of the described system is initiated by rotating the throttle lever 26 to open the fuel cut-off valve 20. Usually this is done after a starter (not shown) has mechanically begun to rotate the turbine rotor of the engine 8, thereby powering the pump 12 (mechanically driven therefrom) and pressurizing fuel through conduit 16. At this point ports 85 and 87 of the valve 14 are closed so that fuel flow is through the minimum flow device 17 as the engine is started. As was previously pointed out, the amount of fuel flowing through the minimum flow device 17 is accurately metered by maintaining a constant pressure differential across the inlet orifice to chamber 82. It will also be apparent that there will be a further pressure drop across the outlet orifice from chamber 82 to chamber 76 by way of passageway 79. Since the output pressure of the pump 12 is dropped twice as it passes into and out of the chamber 82, a relatively low constant differential pressure can be established by the pressure regulating valve 48 to assure accurate metered flow of the fuel, while at the same time providing a sufficiently high pressure for hydraulic actuation of the servosystem (herein illustrated as controlling movement of the piston 58).

During starting operation the hydraulic actuating fluid maintains the piston 58 in its illustrated position. Thereafter, further movement of the throttle lever 26 results in a control signal from the fuel control amplifier 30 which results in displacement of the piston 58 in a direction which will permit flow of fuel through the ports 85 and 87. Since the interior of piston 58 and the chamber 82 both connect with the pressure conduit 52, the interior of the piston 58 is at this point at the same pressure as the chamber 82, and as flow first starts through the metering orifice, the constant pressure differential thereacross is immediately that established by the pressure regulating valve 48 and maintained in all positions of the piston 58. Thus the generally triangular configuration of the metering orifices provides a prescheduled amount of fuel therethrough as a function of piston position. Under low flow conditions there is, of course, a pressure drop as the fuel passes through the metering orifices and then a pressure drop as the fuel passes through the narrow portion of the pressurizing orifices. Thus another pressure drop is provided which maintains the pressure upstream of the valve 14 at a relatively high level. As flow rates are increased, nozzle back pressure increases, and a lesser drop is required across the pressurizing orifices. The ports 87 are progressively widened up to a point where the back pressure of the nozzles 23 approximates a pressure within the piston 58. At this time there is no need for any secondary pressure drop since the output pressure of the pump 12 will automatically be maintained at the desired level for operation of the servosystem by the pressure regulating valve 48. Thus it will be noted that the openings of the ports 87 are sharply increased so that under these flow conditions they provide negligible restriction to the flow of fuel.

FIGURE 4 illustrates that the pressurizing port may be modified as shown by port 87' so that the transition from a fairly substantial restriction to a negligible restriction may be made in a progressive fashion, as indicated by the portions 93 to obtain greater stability in the operation of the fuel system.

The configuration of the ports 87 is not limited to those shown, but may be in any shape that fulfills the requirements of a particular liquid flow control system. In the present instance where the pressurizing and metering valve is used to control the fuel flow to combustor nozzles having a back pressure increasing with fuel flow, it is essential that the pressure drop created across the pressurizing orifice means, in combination with the back pressure of the nozzles, maintains the pressure at the high pressure take-off (conduit 38) above a predetermined minimum level at all flow rates. With high flow rates and high nozzle back pressures the area of the pressurizing orifice is then increased to a point where there is a negligible pressure drop thereacross, thereby minimizing the maximum pressure capacity requirements for the fuel pump.

The control valve 14 minimizes the maximum output pressure of the pump 12, while at the same time providing a relatively high pressure source for actuation of the servosystem or the like at relatively low flow rates, all of this being achieved by the unitary structure of the series-connected orifices illustrated in FIGURE 2 and employing a common pressure regulator for the metering orifices of both the valve 14 and minimum flow device 17.

It will be apparent that in most instances equal advantages can be had where the pressurizing and metering orifice means are reversed and the latter is downstream. By maintaining a constant pressure differential across the metering orifice means, the rate of flow through both orifice means is accurately controlled and the series-related pressure drops provide the desired high pressure liquid source.

It will also be apparent that the invention in its broader aspects is not limited to utility in controlling flow of fuel to gas turbine engines, and in fact, could be employed for other engines or generally in the handling and control of flow of other fluids. The scope of the invention is, therefore, to be derived solely from the appended claims.

Having thus described the invention, what is claimed as novel and desired to be secured by Letters Patent of the United States is:

1. A liquid flow system for delivery of liquid to a discharge point having a back pressure which increases from a low minimum value at low flow rates to a high value at high flow rates, said system comprising
means for pressurizing the liquid,
means for providing a flow path from said pressurizing means to said discharge point,
metering orifice means interposed in the liquid flow path,
pressurizing orifice means interposed in said flow path in series with said metering orifice means,
pressure-regulating means for maintaining a constant pressure differential between said pressurizing means, whereby the rate of flow through said flow path will be a function of the area of the metering orifice means,
means for simultaneously increasing the areas of the metering orifice means and the pressurizing orifice means, whereby the pressurization level of the pressurizing means may be maintained at a minimum level for actuation of an auxiliary device during low flow rates and its maximum value minimized during high flow rates, where there is a large back pressure at said discharge point.

2. A liquid flow system as in claim 1 wherein,
the means for simultaneously increasing the areas of metering orifice means, and the pressurizing orifice means, includes means for increasing the pressurizing orifice means to a point where there is no longer any substantial pressure drop thereacross when the flow rate through the metering orifice means has reached a predetermined level.

3. A liquid flow system as in claim 1 which is adapted to deliver fuel to a gas turbine engine having a combustor nozzle which is the discharge point of the system and which is characterized by having a back pressure that increases with increasing flow rates, said system comprising
a pump for pressurizing the fuel,
a pressurizing and metering valve connected in the fuel flow path between said pump and nozzle,
a high pressure fuel take-off, intermediate said pump and valve, connected to said ancillary device for actuation thereof,
said pressurizing and metering valve being comprised of said housing and said member, said member being in the form of a hollow cylinder,
said housing passageway means comprising inlet and outlet passageways leading to and from said cylinder,
said cylinder having an opening into the interior thereof which forms, at least in part, said metering orifice means, said cylinder having a second opening into the interior thereof which forms, at least in part, said pressurizing orifice means, whereby fuel flows from the inlet passageway to the outlet passageway through the interior of said cylinder,
said orifice means being so oriented relative to said passageways that the area thereof varies as a function of the relative position of said cylinder in said housing.

4. A fuel flow system as in claim 1 which further comprises
   a minimum flow device having passageway means connected in parallel across said pressurizing and metering valve,
   a chamber intersecting said passageway means and a member positioned in said chamber and forming in combination with said passageway means series-related pressurizing and metering orifice means at the inlet and outlet to said chamber,
   pressure regulating means having a pressure connection to a point immediately downstream of the metering orifice means of said minimum flow device and operative in response to such pressure, for maintaining a constant pressure differential across the minimum flow device metering orifice means whereby the rate of flow through said passageway means will be a function of the area of the metering orifice means thereof,
   said series-connected orifice means of the minimum flow device providing first and second pressure drops in the passageway means thereof, thereby minimizing the pressure drop across the metering orifice means thereof and maintaining upstream of said orifice means a source of high pressure fuel for hydraulic actuation of the ancillary device in the event fuel flow is at least primarily through the minimum flow device.

5. A fuel flow system as in claim 4 in which
   the pressure regulating means is in the form of a by-pass valve connected immediately upstream of the metering orifice means of said pressurizing and metering valve and upstream said minimum flow device, and arranged to divert flow therefrom, and the pressure connections downstream of said metering orifice means are interconnected whereby a common pressure regulator is employed for the metering orifice means of both the minimum flow device and the pressurizing and metering valve,
   and further wherein the effective area of the pressurizing orifice means causes a pressure drop which in combination with the back pressure of the nozzle maintains the pressure at the high pressure take-off above a predetermined minimum value, at least to a point where the cylinder is displaced sufficiently to give an increased flow causing the back pressure of the nozzle in combination with the pressure drop across the metering orifice means to maintain said predetermined level, the effective area of said pressurizing orifice means then being increased upon further cylinder displacement to a point where with maximum flow rates and maximum back pressure there is a negligible pressure drop thereacross, thereby minimizing the maximum pressure capacity requirements for said pump.

6. A fuel system as in claim 5 wherein
   the ends of said cylinder are closed and the cylinder is adapted to slide within said housing as a piston between a first and a second position therein, and
   means effective on the ends of the piston are provided for hydraulic actuation or displacement of said piston, and
   the high pressure take-off provides pressurized fuel for such hydraulic actuation,
   and further wherein
   said housing has first and second annular chambers, surrounding said said piston, respectively connected to said inlet and outlet passageways,
   said metering orifice means comprise a pair of oppositely disposed generally triangular openings which in one position of the cylinder are essentially blocked by the housing and which upon displacement of the cylinder progressively admit a greater flow of fuel from said first annular chamber into the interior of said cylinder and in the second position function as the sole means for metering fuel flow, the bases of said triangular openings being beveled inwardly to minimize turbulence resulting from the angular flow vector caused by the divergent sides of the opening,
   a central rod, within said cylinder between said openings, having a width approximating the maximum width of said openings and preventing the liquid streams therethrough from impinging on each other, thus assuring accurate metered flow of a predetermined value,
   said pressurizing orifice means comprising opposed openings in said cylinder which in said one position of said cylinder cooperate with said second annular chamber to prevent fuel flow therethrough, the effective areas of said second openings progressively increasing with displacement of said cylinder toward said second position to a point where, in said second position, a negligible pressure drop occurs thereacross,
   said housing having a third chamber therein which, at least in said first position of said cylinder, opens into said pressurizing orifice and provides, at least in part, the pressure connection to said pressure regulating means.

References Cited
UNITED STATES PATENTS

| | | | |
|---|---|---|---|
| 2,034,573 | 3/1936 | Goegring | 137—625.38 X |
| 2,037,179 | 4/1936 | Robart et al. | 137—625.38 X |
| 2,158,737 | 5/1939 | Wunsch | 251—205 X |
| 2,826,217 | 3/1958 | Dickinson | 137—505.13 |
| 2,836,957 | 6/1958 | Fox | 158—36.4 |
| 2,937,656 | 5/1960 | Evans et al. | 137—110 |
| 3,123,128 | 3/1964 | Zeisloft | 158—36.4 |
| 3,131,750 | 5/1964 | Turner | 158—36.4 |

JAMES W. WESTHAVER, *Primary Examiner.*

UNITED STATES PATENT OFFICE
CERTIFICATE OF CORRECTION

Patent No. 3,391,702

July 9, 1968

Howard B. Kast

It is certified that error appears in the above identified patent and that said Letters Patent are hereby corrected as shown below:

Column 7, line 58, after "fuel" insert -- flow --.

Signed and sealed this 17th day of February 1970.

(SEAL)
Attest:

Edward M. Fletcher, Jr.
Attesting Officer

WILLIAM E. SCHUYLER, JR.
Commissioner of Patents